Feb. 7, 1928.

W. G. STUCK 1,658,421

RAIL BRAKE FOR RAILWAY CARS

Filed Aug. 5, 1926   3 Sheets-Sheet 1

INVENTOR.
WALTER G. STUCK,
BY
ATTORNEYS.

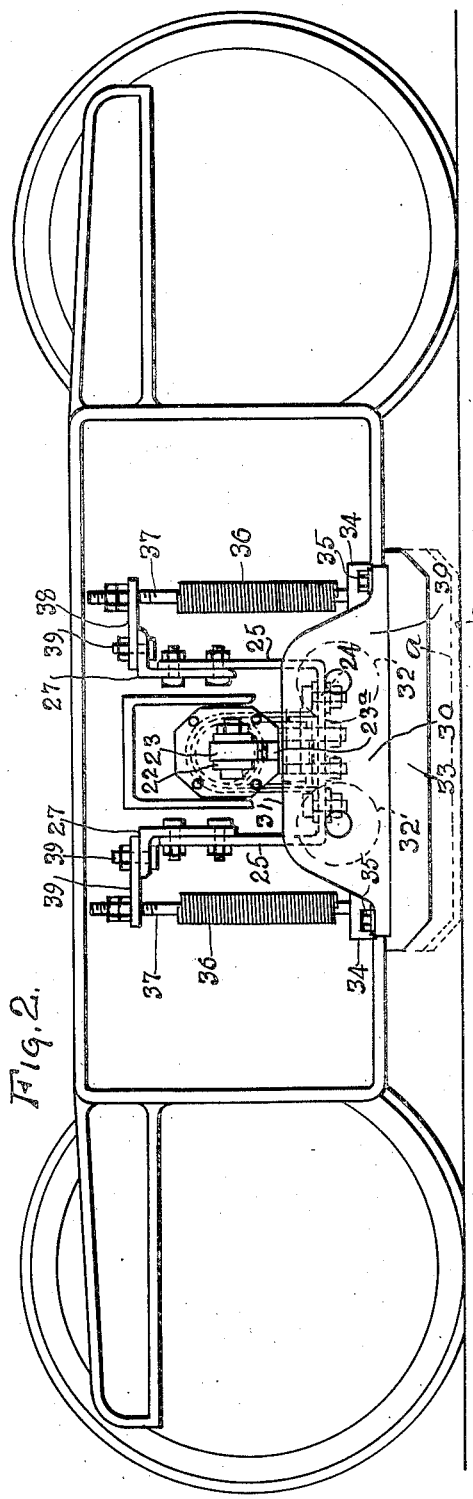
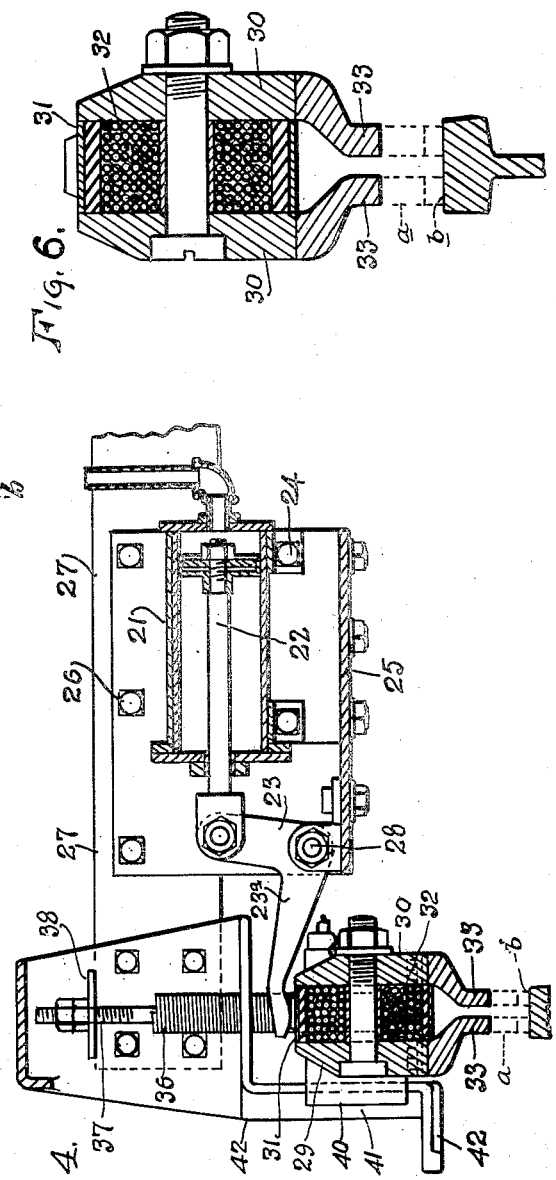

Feb. 7, 1928.
W. G. STUCK
1,658,421
RAIL BRAKE FOR RAILWAY CARS
Filed Aug. 5, 1926  3 Sheets-Sheet 3
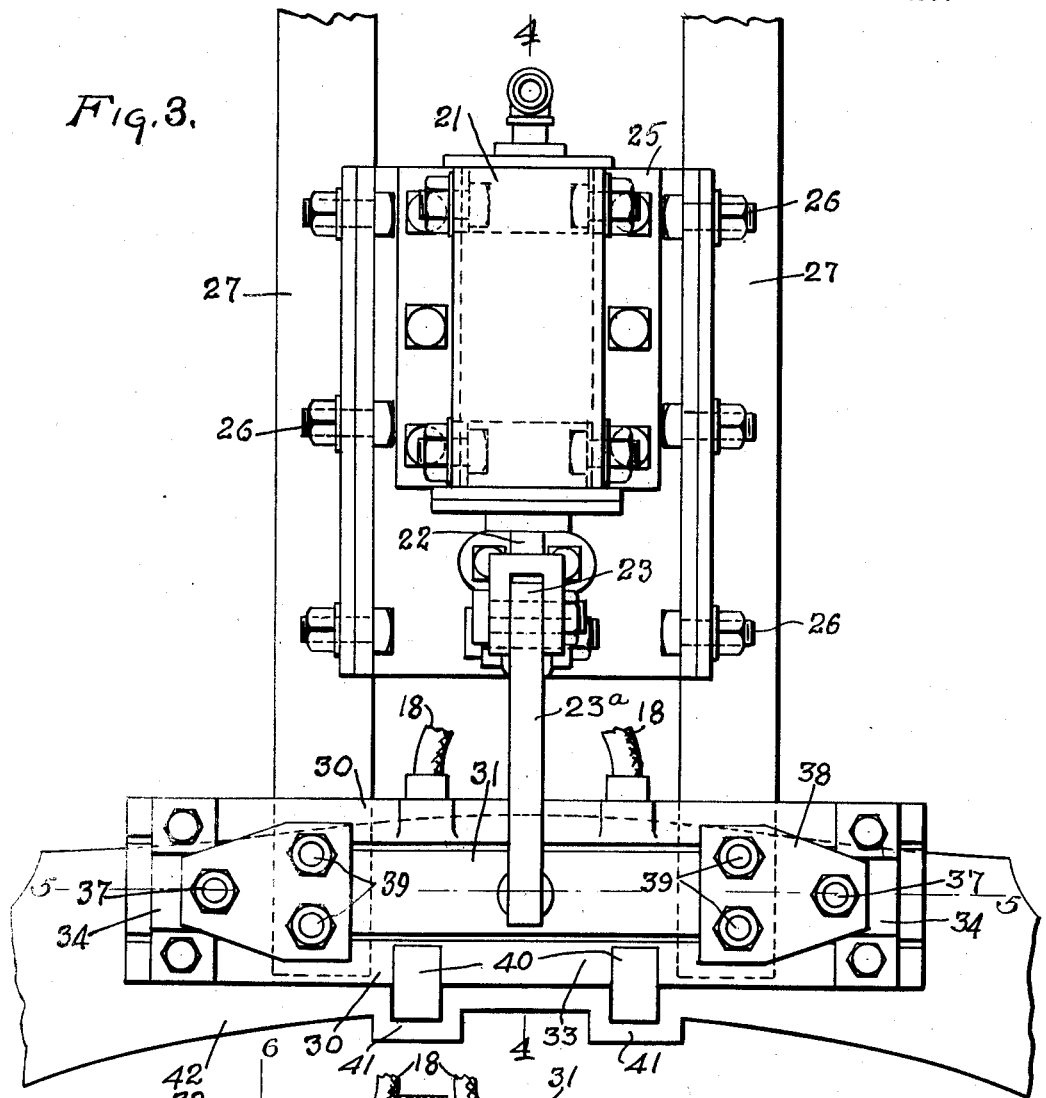
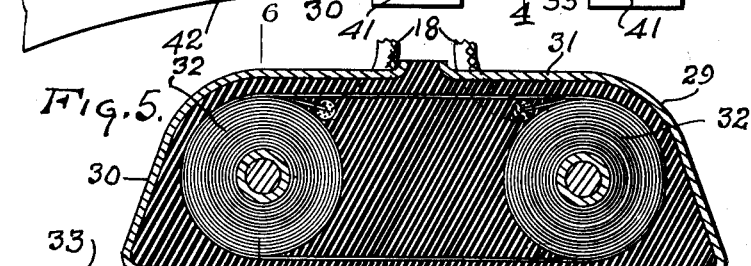
INVENTOR.
WALTER G. STUCK,
BY
ATTORNEYS.

Patented Feb. 7, 1928.

1,658,421

UNITED STATES PATENT OFFICE.

WALTER G. STUCK, OF LEXINGTON, KENTUCKY, ASSIGNOR TO THE CINCINNATI CAR COMPANY, OF CINCINNATI, OHIO, A CORPORATION OF OHIO.

RAIL BRAKE FOR RAILWAY CARS.

Application filed August 5, 1926. Serial No. 127,404.

This invention relates to rail brakes for railway cars, more particularly the type known as electrically operated cars where an electric motor is employed.

The general object of my invention is to utilize the air supply of the usual air brake system to perform two functions with respect to rail brakes as distinguished from wheel brakes, these two functions being, first, the operation of an air engine connected up with the rail brakes to position them within a magnetic field to be created between them and the rail; and secondly, to actuate a pneumatic circuit closer for an electromagnet circuit to energize magnets to cause the magnetization of the rail shoes when they are positioned by the air engine within the magnetic field thus established between the brake shoes and the rail.

A further object of my invention is to combine with the ordinary motorman's air valve a relay valve connected to the motorman's valve by an emergency air line and a "straight" air line, and connected also to a pneumatic switch device and to an air engine, whereby when the motorman's valve is adjusted to admit air through the emergency line or through the "straight" line to the relay valve the air, in either case, will actuate both the pneumatic circuit closer and the air engine, the former to close a magnet circuit and the latter to position the rail brake shoes within a magnetic field between the shoes and the rail created by the magnetization of the shoes.

In the accompanying drawings,

Figure 2 is a side elevation of a truck with my rail brake and air engine to position the rail brake mounted on the truck;

Figure 3 is a plan view of a part of the truck, the rail brake and the actuating air engine;

Figure 4 is a transverse sectional view taken on the line 4—4 of Figure 3 showing the rail brake, the air engine and adjunct devices.

Fig. 5 is a section on the line 5—5 of Fig. 3. Fig. 6 is a section on the line 6—6 of Fig. 5.

Figure 1:
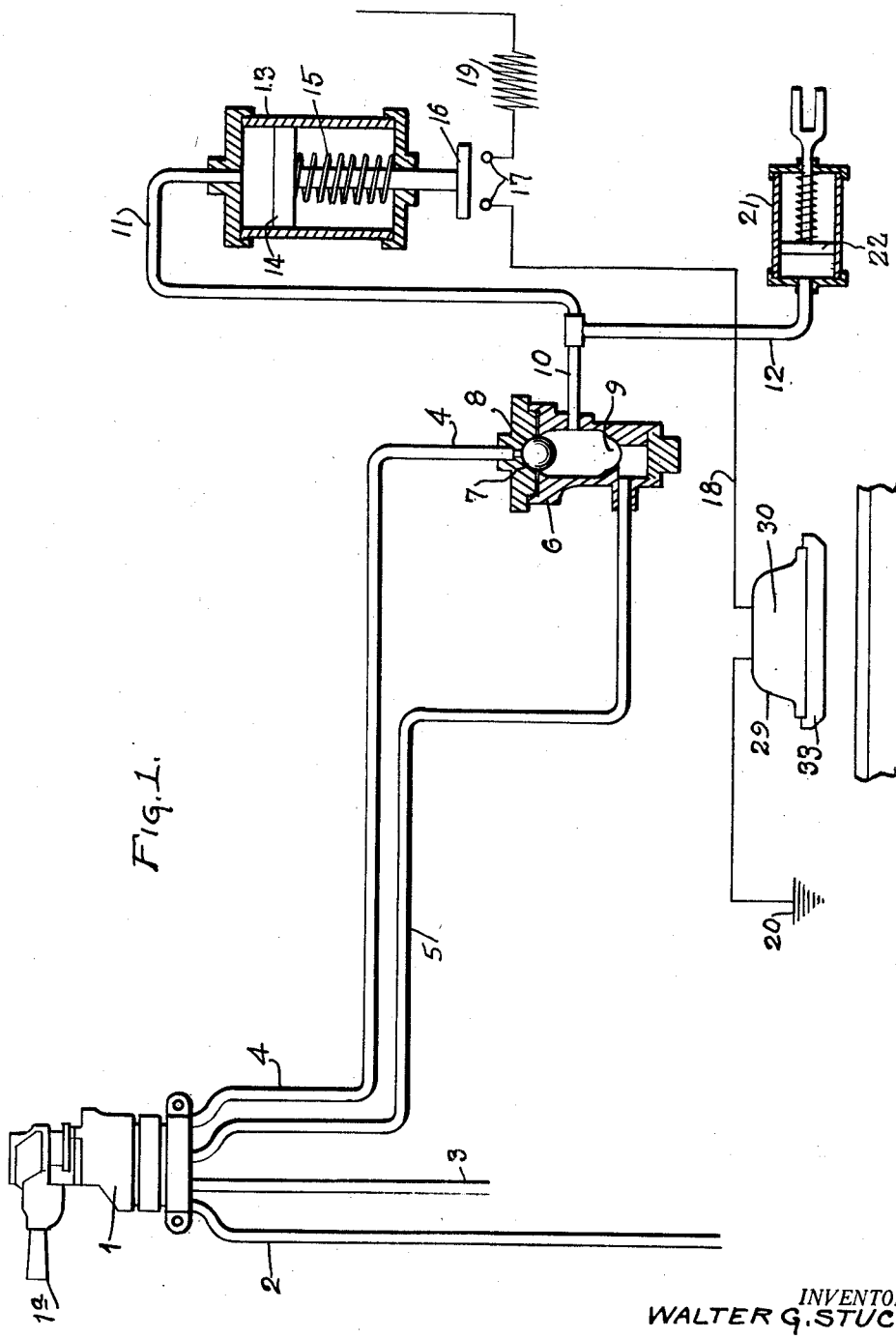
Figure 1 is a diagrammatic view showing the motorman's air valve, the emergency and "straight" lines, the relay valve, the pneumatic circuit closer, the air engine and the rail brake.

Referring first to Figure 1, the numeral 1 indicates a conventional motorman's brake air valve having an air supply line 2, an exhaust pipe 3, an emergency air line 4, and a straight air line 5. One position of the valve handle 1$^a$ will admit air to the emergency line 4; another position will admit air to the "straight" line 5; in either of which positions air will enter the valve from the supply line 2; while in yet another position of the handle 1$^a$ the air will be cut off from the supply line 2 and the exhaust line 3 will be opened to allow the exhaust of the air in either the emergency line 4 or the "straight" line 5 as the case may be.

What I have so far described is in common use and is conventional. But in the case of this invention both the emergency line 4 and the "straight" line 5 enter a relay valve 6. This valve includes a ball 7 which has two seats, one indicated at 8 which when the ball occupies it, will close or cut off the connection between the valve and the emergency line 4, and another seat 9 which when occupied by the ball will cut off connection between the relay valve of the straight air line 5. For illustration purposes the ball 7 is shown in the seat 8 to which it was driven by so positioning the motorman's valve 7 as to let the air into the "straight" line 5, in which case the ball was blown and held against the seat 8, but the reverse would be true when the ball would be seated on the seat 9 if the motorman's valve handle were positioned to admit air into the emergency line 4.

In either case the valve discharge line 10 would receive air from the valve which will pass thence through the circuit closer line 11 and the air engine line 12. Air passing through the line 11 enters a pneumatic circuit closer in the nature of a cylinder 13 with a piston 14 actuated in one direction by a spring 15 to keep the contact 16 in circuit-broken position and actuated in the other direction by the air entering through the pipe 11 to contact the devices 16 with the terminals 17 of the magnet circuit 18. One branch of this circuit has a resistance 19 and connects with the trolley line of the car and the other branch runs to the magnets, presently to be described, and thence is grounded as indicated at 20.

Thus the magnet circuit is opened and closed, the latter for the purpose of energizing the magnets which are utilized to magnetize the rail brake shoes.

And air passing from the relay valve 6 also enters, as above stated, the engine line 12 and passes thence into the cylinder 21 of the air engine. The piston 22 and its rod are thereby actuated to cause the piston rod to operate the bell crank lever 23, best shown in Figures 3 and 4, particularly the latter.

The function of this bell crank lever is to adjust the rail shoes from their normal suspended position, at a safe distance from the rails, to a position within the magnetic field to be established between the shoes and the rail when the shoes are magnetized by the magnets before referred to, as will presently appear in detail.

In order to properly support the air engine I secure it as indicated at 24 to a bracket 25 which in turn is secured by bolts 26 to the transoms 27 of the truck. I also mount the bell crank lever 23 on a pivot 28 carried by the bracket 25.

By observing Figure 4 it will be seen that when the piston 22 is advanced to the left by the entrance of air under pressure into the cylinder 21 the bell crank lever through its arm 23ª will depress the casing or housing generally indicated by the numeral 29, and thereby adjust the rail shoes from their normal safe position above the rail to a position within the magnetic field created by the magnetization of the shoes as will presently appear. In Figure 6 the shoes are shown in full lines in their remote or safe position above the rails; in dotted lines a are shown positioned within the magnetic field and in dotted lines b are shown in contact with the rail.

As the air rushes from the relay valve 6 into the circuit closer line 11 and the engine line 12 at the same time, therefore, the position of the rail shoes just described and the magnetization of them will occur at practically the same time.

I will now refer to the housing or casing 29 and its relation to the magnets and the rail shoes. This casing or housing is composed of side plates 30 and an encircling band between them indicated at 31 to make an enclosure in which are mounted the magnets indicated in dotted lines at 32, as best seen in Figure 2, and whose terminals extend as shown in Figure 1.

At 33 the rail shoes are shown, being interconnected by a cross yoke 34 through bolts 35 which extend through adjacent parts 34 of the side plate 30, and the cross yokes 34, one at each end, are attached to the lower ends of the suspending springs 36 whose other ends are connected by bolts 37 to plates 38 bolted to the truck transoms 27 by bolts 39.

One of the side plates 30 of the housing has a guide 40 fitted to slide up and down in the way 41 formed in the side plate or beam 42 of the truck. It will now be seen that by the connection of the suspending springs 36, the housing with its contained magnets 32 and the connected rail shoes 33 are suspended in normal or safe position above the rails as seen particularly in Figure 2; and that when the bell crank lever 23 is actuated by the air engine it will adjust the rail shoes downward to the position indicated by dotted lines a in Figure 2, when it will be within the magnetic field created between the shoes and the rail by the magnetization of the side plates 30 and the shoes themselves to effect a direct and effective braking contact between the shoes and the rail.

I have shown but one side of the truck and, therefore, one pair of rail shoes and the cooperating mechanism, but it will be understood that the same equipment is applied at both sides of the truck so that both rails of the track will be engaged by rail brake shoes.

It will now be seen that by single manipulation of the motorman's air valve, either the emergency line or the straight air line may be instantly utilized to close the magnet circuit to magnetize and brake shoes and to adjust the brake shoes from normal position to one within the magnetic field that will result between the shoes and the rail due to such positioning and to the magnetization of the shoes, whereby they will be clamped against the rails.

It will be understood that I desire to comprehend within my invention such modifications as may be necessary to adapt it to varying conditions and uses.

Having thus fully described my invention, what I claim as new and desire to secure by Letters Patent, is:

1. In railway brakes, the combination with an air controlling valve, an air line supplied thereby, a circuit closer and an air engine connected with such air line, of suspended rail brake-shoes and associated magnets, the magnets adapted to be energized when the air actuates the circuit closer and the shoes adapted to be positioned within the magnetic field between it and the rail by action of the air engine.

2. In railway brakes, the combination with an air controlling valve, an air line supplied thereby, a relay valve connected to said air line, a circuit closer connected to said relay valve by an air line and an air engine also connected to said relay valve by a pipe line, of suspended rail brake-shoes and associated magnets, an electric circuit for said magnets, closed and opened by said circuit closer, and a device between the engine piston and the brake shoes to cause the positioning of the latter from normal position to that within a magnetic field between the brake-shoes and the rail.

3. In railway brakes, the combination with an air controlling valve, an emergency air line and a straight air line adapted to be alternately charged with air from said valve, a relay valve connected to said emergency and straight air lines and having a discharge air line adapted to be supplied by air entering the valve either from the emergency line or the straight line, pneumatic circuit closer connected to said discharge air line and an air engine also connected to said discharge air line, the circuit closer and the engine piston being operable by the air thus received, of a rail brake and associated magnets, the circuit of the latter being controlled by said circuit closer to magnetize the brake-shoes, and a bell crank lever operated by the air engine to position the shoes within the magnetic field between the shoes and the rail.

4. In railway brakes, the combination with a pneumatic circuit closer and an air engine, of a rail brake comprising shoes and associated magnets, the magnets having a circuit controlled by the circuit closer and adapted to magnetize the shoes, and a bell crank lever operable by the piston of the air engine and adapted to position the shoes within magnetic distance from the rails.

In testimony whereof, I affix my signature.

WALTER G. STUCK.